(12) United States Patent
Skinner

(10) Patent No.: US 8,659,276 B2
(45) Date of Patent: Feb. 25, 2014

(54) INTERLEAVED POWER CONVERTER AND CONTROLLER THEREFOR

(75) Inventor: Andrew John Skinner, Woolacombe (GB)

(73) Assignee: TDK-Lambda UK Limited, Devon (GB)

( * ) Notice: Subject to any disclaimer, the term of this patent is extended or adjusted under 35 U.S.C. 154(b) by 127 days.

(21) Appl. No.: 13/430,924

(22) Filed: Mar. 27, 2012

(65) Prior Publication Data

US 2012/0250363 A1 Oct. 4, 2012

(30) Foreign Application Priority Data

Mar. 28, 2011 (GB) .................................. 1105145.5

(51) Int. Cl.
*H02M 3/157* (2006.01)
*H02M 3/158* (2006.01)
(52) U.S. Cl.
USPC ......................................... 323/272; 323/283
(58) Field of Classification Search
USPC .................. 323/225, 271, 272, 283
See application file for complete search history.

(56) References Cited

U.S. PATENT DOCUMENTS

| | | | |
|---|---|---|---|
| 5,654,881 A | 8/1997 | Albrecht et al. | |
| 5,884,490 A | 3/1999 | Whidden | |
| 6,008,999 A | 12/1999 | Marrero | |
| 6,084,790 A | 7/2000 | Wong | |
| 6,091,233 A | 7/2000 | Hwang et al. | |
| 6,169,671 B1 | 1/2001 | Mao | |
| 6,239,584 B1 | 5/2001 | Jang et al. | |
| 6,897,641 B1 | 5/2005 | Herbert | |
| 7,023,186 B2 | 4/2006 | Yan | |
| 7,295,452 B1 | 11/2007 | Liu | |
| 7,602,156 B2 | 10/2009 | Weng et al. | |
| 8,030,911 B2 * | 10/2011 | Nien et al. | 323/283 |
| 8,193,796 B2 * | 6/2012 | Tang et al. | 323/283 |
| 8,212,539 B2 * | 7/2012 | Osaka | 323/272 |
| 8,248,040 B2 * | 8/2012 | Rausch et al. | 323/207 |
| 8,525,502 B2 * | 9/2013 | Weinstein et al. | 323/283 |
| 2003/0161167 A1 | 8/2003 | Barnett et al. | |
| 2005/0036337 A1 | 2/2005 | Zhang et al. | |
| 2007/0262758 A1 | 11/2007 | Wildash | |
| 2007/0279955 A1 | 12/2007 | Liu et al. | |

FOREIGN PATENT DOCUMENTS

| | | |
|---|---|---|
| CN | 101325367 A | 6/2007 |
| DE | 4407709 A1 | 3/1994 |
| JP | 5211722 A | 1/1992 |
| JP | 8331852 A | 12/1996 |
| JP | 9117146 A | 5/1997 |
| JP | 2007104857 A | 4/2007 |
| WO | 0033153 A1 | 6/2000 |
| WO | 2006137744 A1 | 12/2006 |
| WO | 2010082172 A1 | 7/2010 |

OTHER PUBLICATIONS

Ye, Single Phase Two-Channel Interleaved PFC Converter Using MC56F8006, Freescale Semiconductor, Apr. 2009, pp. 1-26, Document No. AN3843.

(Continued)

*Primary Examiner* — Gary L Laxton
(74) *Attorney, Agent, or Firm* — The Webb Law Firm

(57) ABSTRACT

Disclosed is an interleaved power converter for converting a DC voltage source into a DC voltage output.

19 Claims, 8 Drawing Sheets

(56) References Cited

OTHER PUBLICATIONS

"Boost Converter", Wikipedia, Jan. 9, 2007, http://en.wikipedia.org/wiki/Boost_converter, 8 pages.

"Electromagnetic compatibility (EMC)—Part 3-2: Limits—Limits for harmonic current emissions (equipment input currents ≤ 16 A per phase)", BS EN 61000-3-2:2006+A2:2009, May 31, 2006, published by BSI—British Standards Institution, London, UK, 38 pages.

Grote, T., et al.: "Semi-Digital Interleaved PFC Control with Optimized Light Load Efficiency", IEEE, 2009, pp. 1722-1727.

O'Loughlin, M.: "Advantages of interleaved boost converters for PFC", EDN, Mar. 30, 2006, pp. 75-78.

O'Loughlin, M.: "UCC 28070 300-W Interleaved PFC Pre-Regulator Design Review", Texas Instruments, Jul. 2010, pp. 1-26.

Pinheiro, J.R., et al.: "Control Strategy of an Interleaved Boost Power Factor Correction Converter", IEEE, 1999, 6 pages.

Skanda, V., et al.: "Interleaved Power Factor Correction (IPFC) Using the dsPIC® DSC", Microchip Technology Inc., 2009, pp. 1-46.

Torrico-Bascope, G.V., et al.: "A Single Phase PFC 3kW Converter Using a Three-State Switching Cell", IEEE, 2004, pp. 4037-4042.

Wei, J., et al.: "Applying Transformer Concept to Non-isolated Voltage Regulators Significantly Improves The Efficiency and Transient Response", IEEE, 2003, 8 pages.

Yao, K., et al.: "A Family of Buck-Type DC-DC Converters with Autotransformers", IEEE, 2003, pp. 222-228.

* cited by examiner

INTERLEAVED POWER CONVERTER AND CONTROLLER THEREFOR

BACKGROUND OF THE INVENTION

1) Field of the Invention

The present invention relates to a controller for an interleaved power converter, and an interleaved power converter which incorporates such a controller.

2) Description of the Prior Art

A single phase boost converter comprises an inductor connected between a DC input voltage and a switch. The switch alternatively connects the inductor to the input voltage and to an output, and is driven at a particular duty cycle. The circuit provides an output voltage which is always greater than or equal to the input voltage. A buck converter comprises a similar circuit operating in reverse so that the input voltage is always greater or equal to the output voltage.

As the inductor in a boost converter is continuously charging and discharging, the resulting inductor current has an AC component termed a ripple current. Generally, such ripple currents are undesirable as they degrade component performance and introduce unwanted effects into the circuit.

One of the known ways of reducing ripple currents is to operate two or more converter circuits (sub-circuits) in parallel, and to operate the switches in the respective sub-circuit with a phase shift (ie a phase difference) with respect to each other. The phase difference between the operation of the two switches results in the ripple currents of one of the sub-circuits cancelling the ripple currents of the other. This reduces the ripple current in both the input and the output of the converter.

Such a circuit is known as an interleaved boost converter. A first example of a 2-phase interleaved boost converter used for power-factor correction (PFC) is illustrated in FIG. 1.

A second example of a two phase boost converter is illustrated in FIG. 2. The converter of FIG. 2 is known as a 3-state switching cell. The converter of FIG. 2 is similar to that of FIG. 1, except that the inductors from each sub-circuit are magnetically coupled together in the form of a transformer, and a storage inductor is connected between the voltage input and the transformer.

The circuits of FIGS. 1 and 2 have essentially the same transfer functions and operate in continuous mode with essentially the same duty-cycle.

The converter of FIG. 2 reduces ripple currents flowing through individual components of the circuit as compared with the circuit of FIG. 1. Moreover, the circuit of FIG. 2 displays lower peak currents in the switches when compared to conventional power conversion circuits, and this reduces switching losses.

As is well understood, the control of a single-phase boost converter, such as that described in Freescale application note An3843: Single Phase Two-Channel Interleaved PFC converter Using MC56F8,0006 Rev 0, 04/2009 usually requires three signals to be sensed. Namely, the output voltage of the converter Vout, the DC input voltage Vin (the DC output of a bridge rectifier may conveniently be regarded as the input voltage for this purpose), and the input current I (the current flowing in the common return line to the bridge rectifier may conveniently be sensed for this purpose). The sensed values are processed by a controller, and used to alter the operating conditions to maintain the desired output.

When multiple phases are interleaved, current imbalances between the phases may occur due to variations in performance between the components of the different sub-circuits. It is desirable to adjust for these current imbalances, particularly with converters of the type illustrated in FIG. 2, where current imbalance can lead to transformer saturation, increased RMS currents and reduced reliability.

However, it is not possible to determine the current for each phase (ie the current flowing in the switch of each sub-circuit) from the input current. For this reason, known interleaved power converters sense the current in each switch directly, in order to determine and adjust for current imbalance. See for example the Freescale reference above. The sensed current for each phase may be compared to a common threshold, or to two different thresholds, which allows the controller to identify and adjust for any imbalances.

However, this requires additional current sensing, as compared with the single phase converter, and thus adds to the cost and complexity of the controller.

SUMMARY OF THE INVENTION

According to one aspect of the present invention there is provided an interleaved power converter for converting a DC voltage source into a DC voltage output, the converter comprising:— two or more sub-circuits connected in parallel, each sub-circuit comprising an inductive element, a rectifying element and a controllable switching device connected for converting a DC voltage source into a DC voltage output;

driving means for driving the switching device of each sub-circuit to repeatedly switch on at a time t1 and off at a time t2, with a phase difference between the switch-on times t1 of each switching device;

current sensing means for repeatedly determining an input current value associated with each sub-circuit, by sensing the input current of the converter at a sample point which is at a pre-determined time relative to the switch-on time t1 or the switch-off time t2 of said switching device; and control means comprising:— comparator means for comparing the input current value determined at each sample point with the input current value determined at the preceding sample point, to obtain a measure of current imbalance attributable to one or both of the sub-circuits with which the compared input current values are associated; and current balancing means for adjusting the time interval Ton from t1 to t2, for one or both of the sub-circuits with which the compared input current values are associated, to compensate for said current imbalance.

The inventor has established that the primary cause of current imbalance in an interleaved power converter is timing imbalance between phases, due to differences in driver components and switch performance, and that current imbalance can be corrected by adjusting the on-time of the switching devices by an appropriate amount. Although the primary cause of current imbalance is timing imbalance between phases, the control means is also able to reduce current imbalance which arise from variations in resistance and inductor value between sub-circuits.

By correcting current imbalances in this way, the present invention reduces the cost, size and processor requirements for the controller, as compared with prior art solutions which sense the current flowing in each switch directly, in order to detect and correct for current imbalance.

In the case of a converter having two sub-circuits, the phase difference between the switching devices is preferably substantially 180 degrees.

In the case of a converter having three sub-circuits, the phase difference between the switching devices is preferably substantially 120 degrees.

In the case of a converter having n sub-circuits, where, the phase difference between the switching devices is preferably substantially 360/n degrees.

Accordingly, the switching devices of each sub-circuit are switched on at substantially regular intervals.

The current balancing means is preferably configured to adjust the time interval Ton from t1 to t2, for the sub-circuit with which the latest sensed input current value is associated, to compensate for said current imbalance.

The current sensing means is preferably configured to repeatedly determine said input current value associated with each sub-circuit, by sensing the input current of the converter at a sample point after the switch-on time t1 of said switching device, more preferably at a sample point after the switch-off time t2 of said switching device.

The sample point is preferably calculated to coincide with a rising slope of the input current waveform. The sample point is preferably calculated to be located substantially mid-way along a rising slope of the input current waveform.

In particular, the sample point for each sub-circuit (phase) is preferably calculated to coincide with the first rising slope of the input current after the switch-off time t2 for the switching device of the corresponding sub-circuit (phase).

For a 2-phase interleaved converter operating at <=50% duty cycle, the sample point associated with each sub-circuit is preferably substantially Ton/2+T/2 after the most recent switch-on time t1 of said sub-circuit.

For a 2-phase interleaved converter operating at >50% duty ratio, the sample point associated with each sub-circuit is preferably substantially (Ton-T/2)/2 after the most recent switch-on time t1 of said sub-circuit.

The control means may further comprise current following means for adjusting the time interval Ton from t1 to t2 of each sub-circuit to cause the input current of a converter to follow a reference current.

The control means preferably comprises a Proportional Integral Differential (PID) controller. In this case, a differential term may be used to adjust for current imbalance. The proportional and/or integral terms may be used to cause the converter to follow a reference current.

The control means may be implemented on a microprocessor. The driving means may also be implemented on a microprocessor, or two separate microprocessors. The control means and the driving means may be implemented on a single microprocessor.

According to another aspect of the present invention there is a controller for an interleaved power converter, wherein an interleaved power converter comprises two or more sub-circuits connected in parallel, each sub-circuit comprising an inductive element, a rectifying element and a controllable switching device connected for converting a DC voltage source into a DC voltage output, and driving means for driving the switching device of each sub-circuit in the converter to repeatedly switch on at a time t1 and off at a time t2, with a phase difference between the switch-on times t1 of each switching device;

the controller comprising:— receiving means for repeatedly receiving a signal which represents an input current value associated with each sub-circuit at a sample point which is at a pre-determined time relative to the switch-on time t1 or the switch-off time t2 of said switching device;

comparator means for comparing the input current value determined at each sample point with the input current value determined at the preceding sample point, to obtain a measure of current imbalance attributable to one or both of the sub-circuits with which the compared input current values are associated; and current balancing means for determining the time interval Ton from t1 to t2, for one or both of the sub-circuits with which the compared input current values are associated, to compensate for said current imbalance.

According to another aspect of the present invention there is provided a multi-phase interleaved power converter for converting a DC voltage source into a DC voltage output, the converter comprising:— two or more sub-circuits connected in parallel, each sub-circuit comprising an inductive element, a rectifying element and a controllable switching device connected for converting a DC voltage source into a DC voltage output;

driving means for driving the switching device of each sub-circuit to repeatedly switch on at a time t1 and off at a time t2, with a phase difference between the switch-on times t1 of each switching device, such that each sub-circuit is associated with a different phase of the converter; and current sensing means for repeatedly determining an input current value associated with each phase, by sensing the input current of the converter at a sample point which is at a pre-determined time relative to the switch-on time t1 or the switch-off time t2 of the switching device; and control means comprising:— comparator means for comparing the input current value determined for each phase with the input current value determined for the preceding phase, to obtain a measure of current imbalance between said phases; and current balancing means for adjusting the time interval Ton from t1 to t2, for one or both of the sub-circuits with which the compared input current values are associated, to compensate for said current imbalance.

According to another aspect of the present invention there is provided a controller for a multi-phase interleaved power converter, wherein a multi-phase interleaved power converter comprises two or more sub-circuits connected in parallel, each sub-circuit comprising an inductive element, a rectifying element and a controllable switching device connected for converting a DC voltage source into a DC voltage output, and driving means for driving the switching device of each sub-circuit to repeatedly switch on at a time t1 and off at a time t2, with a phase difference between the switch-on times t1 of each switching device, such that each sub-circuit is associated with a different phase of the converter;

the controller comprising:— receiving means for repeatedly receiving a signal which represents an input current value associated with each phase at a sample point which is at a pre-determined time relative to the switch-on time t1 or the switch-off time t2 of said switching device;

comparator means for comparing the input current value determined for each phase with the input current value determined for the preceding phase, to obtain a measure of current imbalance between said phases; and current balancing means for determining the time interval Ton from t1 to t2, for one or both of the sub-circuits with which the compared input current values are associated, to compensate for said current imbalance.

The preferred and optional features outlined in connection with the first aspect of the invention also apply to the other aspects of the invention defined herein. Other preferred and/or optional features may be defined in the independent claims.

The control means, current sensing means, comparator means, current balancing means, current following means, and driving means may respectively comprise a control means, a current sensing module, a comparator module, a current balancing module, a current following module, and a driving module.

BRIEF DESCRIPTION OF THE DRAWINGS

Embodiments of the present invention are described below with reference to the accompanying drawings in which:—

DETAILED DESCRIPTION OF THE PREFERRED EMBODIMENTS

Figure 1:
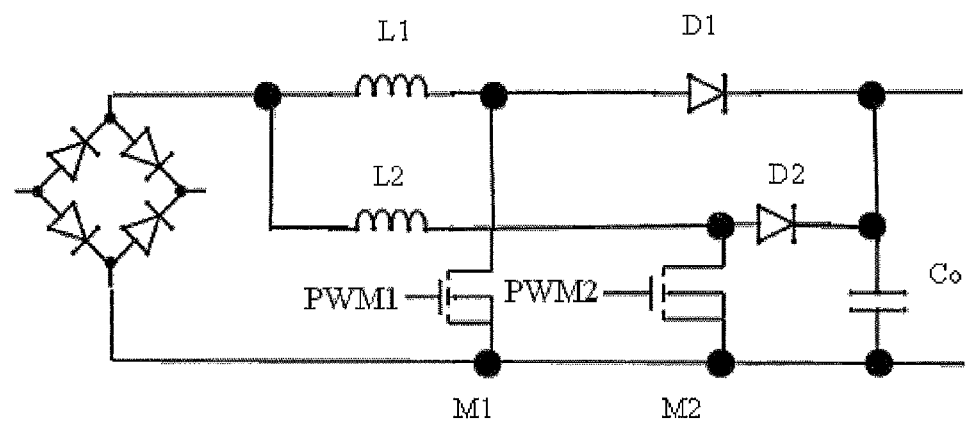
FIG. 1 is a first example of a 2 phase interleaved boost converter.

Elements common to different embodiments and different figures are labeled with the same reference numerals.

An embodiment of the present invention is described below with reference to the two-phase interleaved boost converter 20 illustrated in FIG. 2.

Figure 2:
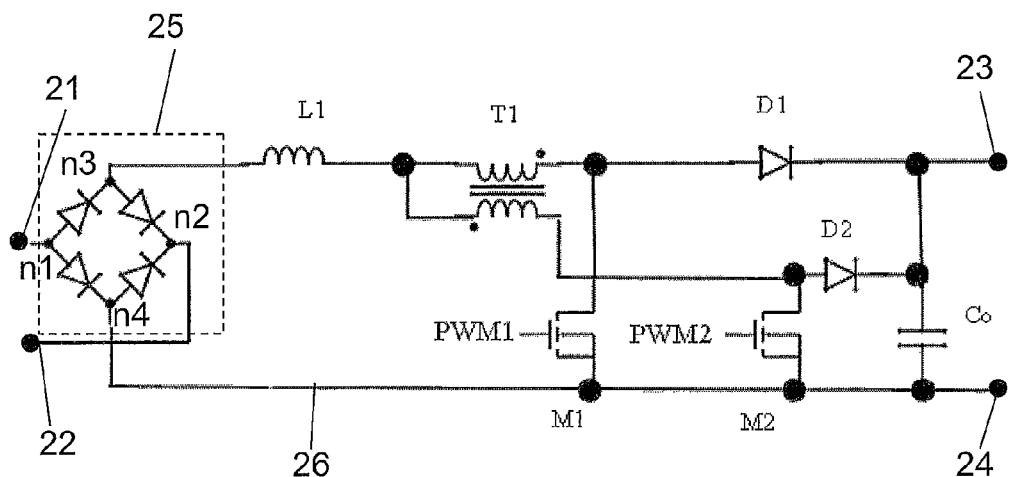
FIG. 2 is a second example of a 2 phase interleaved boost converter.

The converter of FIG. 2 comprises input terminals 21, 22 and output terminals 23, 24. The input terminals are connected to two nodes n1, n2 of a four diode bridge rectifier circuit 25. The rectifier circuit rectifies an AC input voltage supplied at the input terminals, to provide a DC input voltage Vin at nodes n3 and n4 of the rectifier circuit. A common return line 26 is connected between node n4 of the rectifier circuit and output terminal 24.

Node n3 of the rectifier circuit is connected to an inductor L1, which is in turn connected to two magnetically coupled inductive elements of a transformer T1.

Each inductive element of the transformer T1 is in turn connected to the anode of a respective diode D1, D2. The cathode of both diodes is connected to output terminal 23. Thus, two current paths are formed between node n4 of the rectifier circuit and output terminal 23. One path is through the first inductor L1, the first inductive element of the transformer T1 and the first diode D1, to the output terminal 23. The other path is through the first inductor L1, the second inductive element of the transformer T1 and the second diode D2, to the output terminal 23.

The inductive elements of the transformer T1 are magnetically coupled by a ferrite core, which is schematically depicted by the two parallel lines in FIG. 2.

The circuit further comprises MOSFET switches M1, M2. The drain terminal of each switch is connected to the junction between each inductive element of the transformer T1 and the respective diode D1. The source terminal of each switch is connected to the common return line 26. A digital pulse width modulator dPWM1, dPWM2 (not shown in FIG. 2) is connected to the gate terminal of each switch and delivers a pulse width modulated control signal PWM1, PWM2 to the respective switch M1, M2. These control signals dictate whether the switches are on/closed or off/open. That is to say, when PWM1 is high, switch M1 is on, and when PWM1 is low, switch M1 is off. Similarly, when PWM2 is high, switch M2 is on, and when PWM2 is low, switch M2 is off. Thus, the duty cycles of the switches and their relative phase difference are controlled by the pulse width modulators dPWM1, dPWM2, which in turn are controlled by the control module 60 illustrated in FIG. 6. The control module 60 determines the duty cycle/on-time required for each switch for the input current of the converter to follow a reference current Iref, and to achieve current balance, as described in more detail below.

A capacitor Co is connected between the output terminals 23, 24 and provides output filtering in a manner known in the art. Other forms of output filtering are also known, and may be used in conjunction with circuits according to embodiments of the invention.

Inductor L1, the first inductive element of the transformer T1, diode D1 and switch M1 comprise a first power conversion sub-circuit, and inductor L1, the second inductive element of the transformer T1, diode D2 and switch M2 comprise a second power conversion sub-circuit.

In one example of the circuit illustrated in FIG. 2, the diodes in the rectifier circuit each have a value of 8 A, 600V, the inductor L1 has a value of 150ìH, the coupled inductive elements of the transformer have a winding ratio of 1:1 and an inductance of 800ìH, the diodes D1, D2 each have a value of 4 A, 600V, and the filter capacitor Co has a value of 270ìF. The circuit may be operated at 450 W input power at 90 Vac. The relative phase difference between the converters is approximately 180 degrees.

Figure 3A:
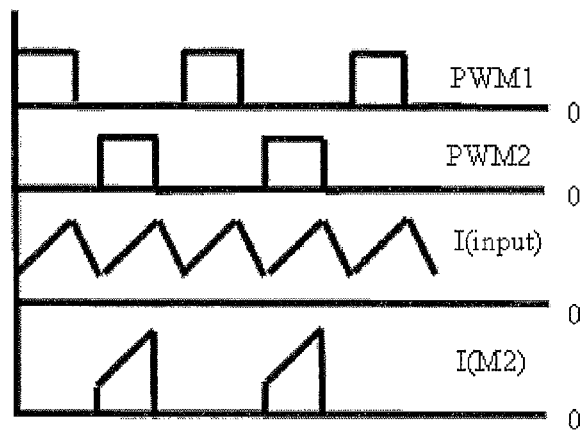
FIGS. 3a and 3b show representative current waveforms for the converter of FIG. 2 operating at 33% and 66% duty cycle respectively.

FIG. 3a shows theoretical current waveforms which represent operation of the circuit of FIG. 2 at 33% duty cycle, assuming a constant reference current Iref.

The lines labeled PWM1 and PWM2 respectively represent the level of the digital control signals PWM1 and PWM2. The level of signals PMW1 and PMW2 dictates the operation of switches M1 and M2. The line labeled I(M2) in FIG. 3a represents the current flowing in switch M2, ie, the current for phase 2 of the converter. When PMW2 is low, switch M2 is off, such that no current flows through the switch. When PMW2 is high, switch M2 is on. During the on-time of switch M2, the current increases at a substantially constant rate from a first value to a second value. The current waveform for switch M1 (not shown), ie, the current for phase 1 of the converter, is substantially identical to that of switch M2, but shifted by approximately 180 degrees, such that the on-time of switch M1 coincides with the interval during which PMW1 is high.

The line labeled I(input) represents the resulting input current I of the converter, i.e., the current flowing into node n4 of the rectifier circuit. With a 33% duty cycle (or any cycle up to 50%), and a phase offset of 180 degrees, only one of the switches is on at any one time. When one switch is on, the input current approximately equals 2× the current flowing through that switch, due to the action of the 1:1 transformer. Over the interval when both switches are off, the input current drops from the second value down to said first value, at a substantially constant rate. Accordingly, the input current has a sawtooth waveform.

FIG. 3a illustrates representative current waveform for a circuit operating at 33% duty cycle. However, the lines which represent switch current and input current will have a similar profile for any duty cycle <=50%.

Figure 3B:
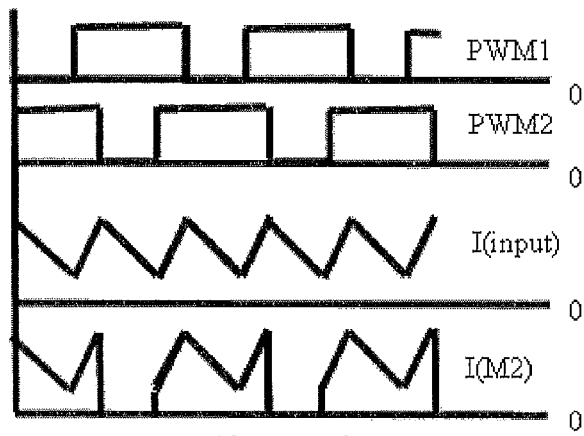

FIG. 3b shows the corresponding theoretical current waveforms for the circuit of FIG. 2 operating at 66% duty cycle, again, assuming a constant reference current Iref. With a duty cycle of 66%, or any duty cycle above 50%, and a phase difference of 180 degrees, one of the switches M1, M2 is always on.

From the line labeled I(M2) in FIG. 3b, it can be seen that the on-time waveform for switch M2 has three regions. The central region corresponds to the interval of the cycle when only PMW2 is high. The outer regions correspond to the intervals when PMW1 is also high. In the first region, the current increases at a substantially constant rate from a first value to a second value. In the second (central) region, the current decreases back to the first value at a substantially constant rate. In the third region, the current increases at substantially the same rate as in the first region, back up to the second value. The current waveform for switch M1 (not shown) is substantially identical to that for switch M2, but shifted by approximately 180 degrees, such that the on-time of switch M1 coincides with the interval during which PMW1 is high. Since the on-times for the switches have a relative phase difference of 180 degrees, the first region of the current waveform coincides with the third region of the current waveform for the other switch, and the current waveforms for both switches are substantially identical within these regions.

During the intervals when only one of the switches M1, M2 is on, the input current (I(input)), takes the value of 2× the current through the switch which is on, due to the action of the 1:1 transformer. Outside this interval, when both switches are on, the input current is equal to the current through the 2 switches. Accordingly, the input current has a sawtooth waveform.

FIG. 3b illustrates representative current waveforms for a circuit operating at 66% duty cycle. However, the lines which represent switch current and input current will have a similar profile for any duty cycle >50%.

As can be seen from FIGS. 3a and 3b, in a theoretical circuit, the current flowing in the respective switches at a common operating point at the output of the controller should be identical. However, in practice, differences in driver components and switch performance cause timing differences which lead to current imbalances. Moreover, in a practical circuit, there is inevitably some variation between sub-circuits in the resistance of the inductors and switching devices. For circuits of the type illustrated in FIG. 2, variations in the coupling coefficient and the resistance of the coupling transformer between the different phases may also lead to current imbalance.

Timing variations are the main cause of current imbalance in both types of circuit. In this respect, the net voltage imbalance must be offset by the current imbalance according to equation (1):

$$V\text{difference} = I\text{difference} * R \quad (1)$$

where V difference is the voltage imbalance applied to the inductive components due to a timing difference between phases, Idifference is the corresponding current difference between the phases, and R is the resistance of the inductor and switches in each phase. Typically, R is small, which means that a big current adjustment is required for a relatively small timing imbalance, of the order of 10 s of ns.

Figure 4:
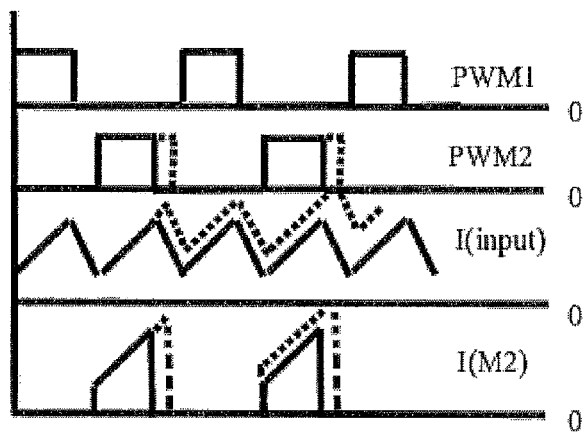
FIG. 4 shows representative current waveforms for the converter of FIG. 2 operating at 33% duty cycle, and illustrates the effect of switch M2 having an extended on-time.

FIG. 4 illustrates the effect of switch M2 having an extended on-time, for a converter of the type illustrated in FIG. 2, operating at 33% (or up to 50%) duty cycle. The theoretical (steady state) current profiles are indicated by solid lines, and the effects of extended on-time in phase 2 are shown by the dotted lines. As can be seen, the input current increases during the on-time of phase 2, but remains at a fixed value above the steady state during the on-time of phase 1. Over time, a significant current imbalance will occur.

The inventor has determined that current imbalances between phases can be corrected by altering the on-time of the switching devices in each sub-circuit.

For the purpose of control, it is necessary to select suitable sample points in the input current waveform. These points are preferably on a rising slope because, for a converter operating in discontinuous mode, the falling slope could cross zero at any time. It is also preferable for the sample point to be as early in the waveform as possible, in order to minimise latency. It is also preferable for the instantaneous current value at the sample point to be substantially equal to the average value.

Figure 5A:
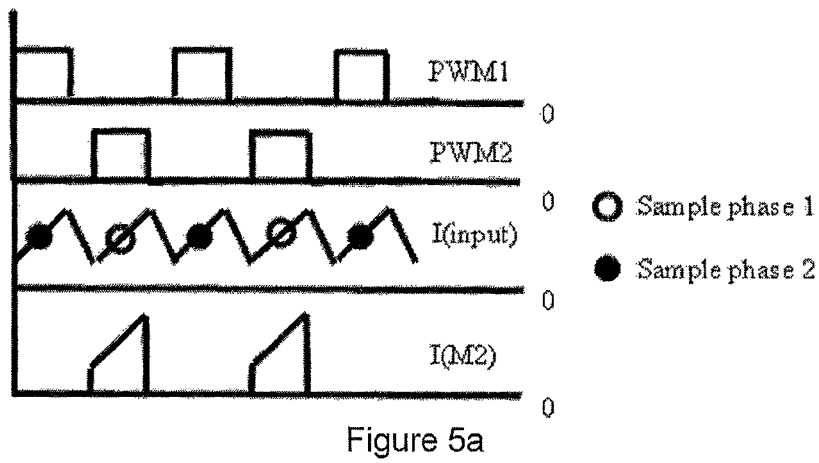
FIGS. 5a and 5b show representative current waveforms for the converter of FIG. 2, and indicates suitable sample points.

FIG. 5a illustrates suitable sample points for a converter of the type illustrated in FIG. 2 operating at 33% (or up to 50%) duty cycle. The solid dots indicate sample points associated with phase 2. These are located on the first rising slope after switch-off of the switch in phase 2 of the converter. The outline circles indicate the sample points associated with phase 1. These are located on the first rising slope after switch-off of the switch in phase 1 of the converter.

Figure 5B:
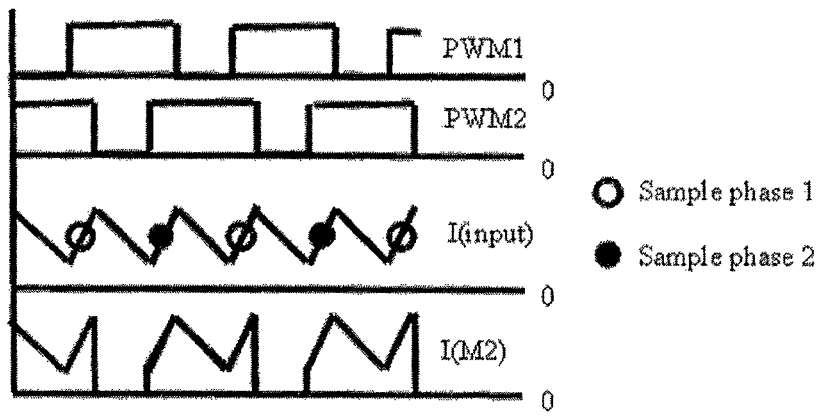

FIG. 5b illustrates suitable sample points for a converter of the type illustrated in FIG. 2 operating at 66% (or over 50%) duty-cycle. Again, the solid dots which indicate sample points associated with phase 2 are located on the first rising slope after switch-off of the switch in phase 2 of the converter, and the outline circles which indicate the sample points associated with phase 1 are located on the first rising slope after switch-off of the switch in phase 1 of the converter.

In both cases, all sample points are located approximately mid-way along the rising slope of the input current, and thus represents an average current value. However, alternatively, in the case of operating at 66% (or over 50%) duty-cycle and where sampling noise exists, the sampling points may be located approximately mid-way along the down slope of the input current.

Based on the sample points illustrated in FIGS. 5a and 5b, and on assumptions A to E below, the differential change in current can be expressed as shown in table 1.

A. Substantially fixed, or slowly changing, switching frequency of period T;
B. Phase shift between phases of 360/n, where n is the number of phases;
C. Trailing edge modulation;
D. Operation with small signal variation in duty cycle Ton/T (near steady state), and with low gain at the switching frequency of the converter;
E. The current reference Iref which is followed by the controller is substantially invariant, or changes slowly.

TABLE 1

|  | Duty <= 50% | Duty >50% |
| --- | --- | --- |
| Change in input current I between phase 1 and phase 2 samples (Differential term for phase 2) | Vout/2L * dTon(2) | Vout/2L * dTon(2) |
| Change in input current I between phase 2 and phase 1 samples (Differential term for phase 1) | Vout/2L * dTon(1) | Vout/2L* dTon(1) |

In table 1, Vout is the output voltage of the converter, L is the value of inductor L1, dTon(1) is a differential change in on-time for phase 1, and dTon(2) is a differential change in on-time for phase 2.

From table 1 it can be seen that the sample data for each phase has a differential value that is dependent on changes in its own on-time away from the steady state (dTon/dT). This relationship can be used to balance the on-time and thus the current in each phase. That is to say, table 1 demonstrates that an imbalance in on-time will result in differential changes in current.

Figure 6:
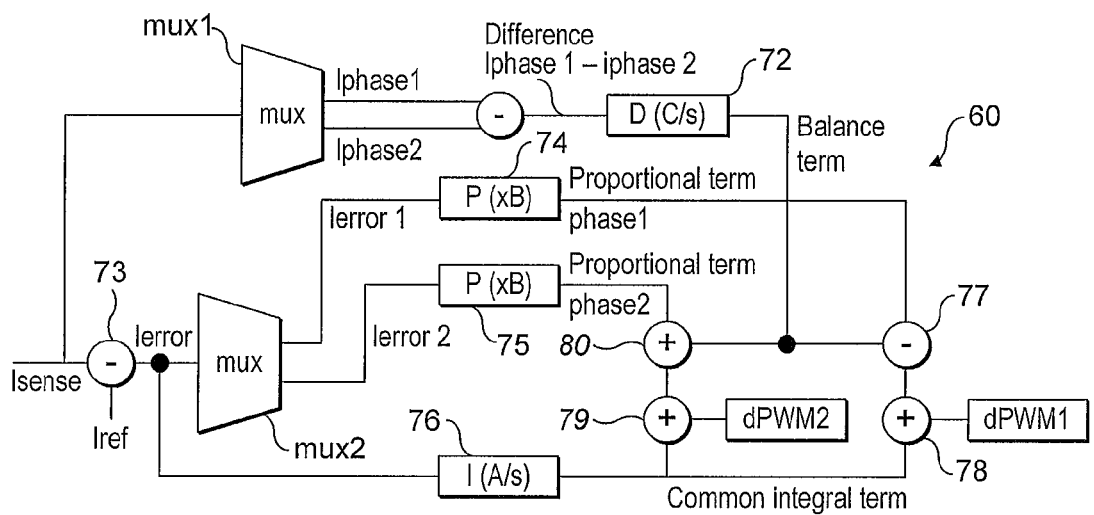
FIG. 6 illustrates a Proportional Integral Derivative (PID) controller for use with the interleaved boost converter shown in FIG. 2, in accordance with an embodiment of the present invention.

FIG. 6 illustrates a Proportional Integral Derivative (PID) controller 60 for use with the interleaved boost converter shown in FIG. 2, in accordance with an embodiment of the present invention.

An analogue to digital converter (ADC) (not shown) is used to sample the input current I flowing in the return line 26 of the converter 20, and to convert this analogue measurement into a digital signal Isense. The ADC samples the input current once for each phase within each full cycle of the operating frequency, at a fixed point in the waveform.

A single current sensing means is preferably used for both phases. That is to say, a single current sense circuit and/or the same ADC is preferably used for both (all) phases. This eliminates a number of potential errors causes by electrical noise in the current sense up to the ADC.

It will be appreciated that the, or another, ADC may also sample other analogue measurements, for example, the output voltage Vout between output terminals 23, 24 in converter 20 and the input voltage Vin between nodes n3, n4.

The signal Isense is provided to a multiplexer module mux1. Depending on which switch which has most recently switched off at the sample point, the multiplexor mux1 outputs a signal Iphase1 or Iphase2. Iphase1 represents the most recent sampled input current associated with phase 1, and Iphase2 represents the most recent sampled input current for phase 2. Since the input current is sampled once during each phase, these two signals will always represent the two most recent input current measurements.

Signals Iphase1 and Iphase2 are provided to module which subtracts Iphase2 from Iphase1 and outputs a signal Diff_Current which represents the magnitude of this difference.

The signal Diff_Current is applied to module 72 which multiplies the signal Diff_Current by the differential current gain C and integrates it, to output a signal D which represents a differential balance term D.

The signal Isense is also applied to module 73 which subtracts Isense from a reference current value Iref and outputs a signal Ierror which represents the magnitude of this difference.

The signal Ierror is applied to a multiplexer module mux2. For phase 1 samples, the multiplexer mux2 outputs a signal Ierror1 which corresponds to Ierror, and for phase 2 samples, the multiplexer outputs a signal Ierror2 which corresponds to Ierror.

Signal Ierror1 is applied to module 74 which multiplies the signal Ierror1 by a multiplier B to output a signal P1 which represents a proportional term P1 for phase 1.

Signal Ierror2 is applied to module 75 which multiplies the signal Ierror2 by a multiplier B to output a signal P2 which represents a proportional term P2 for phase 2.

The signal Ierror is also applied to a module 76 which multiplies the signal Ierror by a multiplier A, and integrates it, to output a signal I which represents a common integral term.

Signal D and signal P1 are applied to module 77. Signal I and the output of module 77 are applied to module 78 to provide an output signal which represents the sum of the proportional error term and the integrated error term, minus the differential balance term.

Signal D and signal P2 are applied to module 79. Signal I and the output of adder module 79 are applied to an module 80 to provide an output signal, which represents the sum of the proportional error term, the integrated error term, and the differential balance term.

The output signals of the PID controller are supplied to the digital pulse width modulators dPWM1 and dPWM2 which drive the switches M1 and M2. The proportional P and integral I terms ensure that the converter follows a reference Iref. The differential term D corrects current imbalances between phases. It will be appreciated that multipliers A, B and C weight the respective differential, proportional and integrated terms. The values of these terms are determined in accordance with the properties of the device and/or external conditions, to result in suitable output signals.

Figure 7:
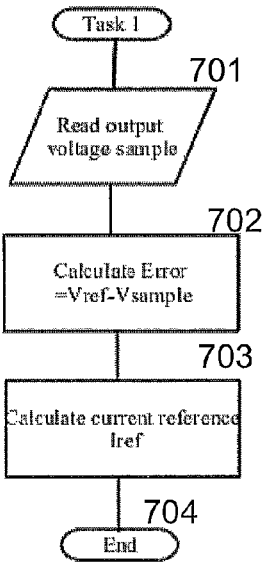
FIGS. 7, 8 and 9 respectively illustrates Tasks 1, 2 and 3 of the controller of FIG. 6.
Figure 8:
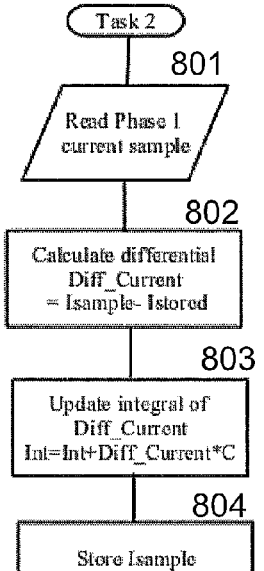
Figure 9:
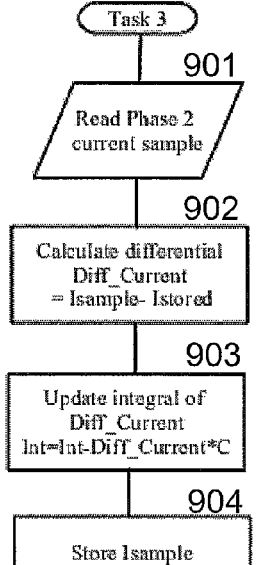

FIGS. 7, 8 and 9 are flow charts which illustrate the operation of the controller of FIG. 6.

FIG. 7 illustrates Task 1, which calculates the current reference Iref to be followed by the converter. FIG. 8 illustrates Task 2, which calculates the proportional, integral and differential terms of the converter, and updates the ADC and the digital PWM module for phase 1. FIG. 9 illustrates Task 3, which includes the same steps as Task 2, performed in relation to phase 2.

The three tasks are called periodically during the operation of the converter, typically as interrupts. Tasks 2 and 3 are synchronized with the control signals PWM1 and PWM2, and are called after completion of the ADC conversion of the input current. Task 1 is typically called at a lower rate than Tasks 2 and 3, and is preferably called in a way that it is not running when Tasks 2 and 3 are running, or can be interrupted by them.

The controller may perform other tasks which enable initialization of the controller, and other housekeeping functions. Such tasks will be straightforward for a person skilled in the art to implement, and are not described here.

With reference to FIG. 7, at step 701 of Task 1, the controller reads an output voltage sample Vsample, as sensed by an ADC (not shown). At step 702, the controller calculates the difference between a reference voltage Vref and Vsample, VError=Vref−Vsample. At step 703, the controller calculates the new current reference Iref using VError determined at step 702. At step 704, the task ends.

With reference to FIG. 8, at step 801 of Task 2, the controller reads the input current sample Isample for phase 1, as sensed by the ADC (not shown). At step 802, the controller calculates the difference between Isample and Istored, Diff_Current=Isample−Istored, where Istored represents the input current sample sensed during the previous phase. At step 803, the controller updates the integral Int of the differential current term, Int=Int+Diff_Current*C, where C is the differential current gain. The differential term used to balance the current is the integral of Diff_Current*C. At step 804, the controller stores Isample as Istored. At step 805, the controller calculates the difference between the reference current Iref and Isample, Ierror1=Iref−Isample. At step 806, the controller updates the integral error term I according to I=I+IError1*A, where A is a multiplier which weights the integral error term. At step 807, the controller calculates the proportional error term P=IError1*B, where B is a multiplier which weights the proportional error term. At step 808, the controller uses the values calculated for P, I and D to calculate the new duty cycle for the switching device associated with phase 1 of the converter. That is to say, the on-time Ton for this converter is adjusted. The controller also determines the next sampling point. At step 809, the controller updates the digital PWM module dPWM1 which controls the operation of the phase 1 switching devices, to apply the updated duty cycle. The controller also updates the ADC with the new sampling point. At step 810, the task ends.

With reference to FIG. 9, Task 3 comprises steps which correspond to those of Task 2, except that Isample is read at the phase 2 sample point.

If the phases are balanced, then the average current in each phase can be calculated from the input current, since the number of active phases will always be known by the controller. For example, in the case of 2 phases, and an input current of 2I, the current in each phase is approximately I. Thus, the current in each phase can be limited to a safe level by controlling the input current. Accordingly, the current in each phase does not need to be measured directly.

The controller, that seeks to maintain the input current at a reference level Iref, will try to adjust for variations in input current. Thus, if the on-time of one phase is incorrect, causing the current in that phase to deviate from the required value, the input current will also change, causing the on-time of both (or all) phases to be adjusted in an attempt to bring the input current to the required value. Whilst this is taking place, the on-time in both (or all) phases will be adjusted, but the timing imbalance will remain. Once steady state with imbalance has been established, the imbalance will not be seen in the input current. For example, if steady state is achieved with a phase 1 current of 1 A and a phase 2 current of 2 A, the input current will be 3 A, and will look identical in terms of shape and ripple to the input current achieved with a balanced current of 1.5 A in each phase. However, during the period over which the current in each phase is changing from an initial value (e.g. 0 A) to the steady state values, the on-times in each phase must be different, in order for the current in each phase to reach different values. This difference in on-times can be detected and corrected, in order to balance the current. For this reason, an integrator is used to record the variations which occur during transient operation. This enables the controller to remember what it learns whilst the current is changing. In some applications, including for example PFC applications, the current is always varying, so that the controller is "learning" all the time.

A PFC circuit is continually operating in a transient state as the input current seeks to follow a changing AC reference signal, and the differential current term will be continually updated.

However, for an application running from a DC input, the controller will only be updated when changes occur such as at start-up, during changes in output load, and if drift occurs within the circuit. A digital implementation of the controller is preferred in such cases, although, in general, an analogue implementation is possible.

For AC applications it is preferable to reset the digital controller prior to re-starting the converter after going through a mains zero crossing.

For the 2-phase interleaved converter illustrated in FIG. 2, the sample point of the input current is dependent on the operating duty cycle, and is preferably defined relative to the start of the on-time Ton for each phase, as shown in Table 2.

TABLE 2

| 2-phase PFC switch Ton | Ton <= T/2 | T/2 < Ton <= T |
|---|---|---|
| ADC sample point | Ton/2 + (T/2) | (Ton − T/2)/2) |

Using the sampling points shown in table 2, the controller of FIG. 6 is able to control the PWM signals PWM1 and PWM2 to cause the converter to follow a reference voltage Iref, and is also able to correct for current imbalances between phases through adjustments to the on-time (duty cycle) of the switches.

From equation (1), it can be seen that any current imbalance that occurs whilst timing balance is being restored will be corrected due to the winding resistance, once timing balance is restored.

To determine the required gain for the differential current gain C, an exemplary 400 W prototype design based on a Texas Instruments TMS320F28027 Piccolo microcontroller using a 3-state switching cell is considered.

The integrated differential current term Int is given by equation (2).

$$\text{Int}=\text{Int}*Z^{-1}+C*(I\text{sample}-I\text{sample}*Z^{-1}) \quad (2)$$

where $Z^n$ represents the nth sample of a signal. Thus, for example, Isample*$Z^{-1}$ represents the previous value of Isample.

The value of PFC inductor L1 is L=150 µH, the switching period is T=10 µs, and the PFC output voltage Vout=380V.

The minimum value of C would be where the rate of change in on-time is just sufficient to prevent saturation of one of the magnetic components in the circuit, the worst case in this design being the transformer T1.

The digital PWM module has integer step sizes of 25 ns. For the purpose of calculation, the size of the fractional steps stored in a 16 bit register may be considered to be 25 ns/$16^2$=25 ns/65536. However, only the top 8 bits of the fractional term are actually used by the digital PWM module in the TMS320F28027.

The on-time error due to component variation can be assumed to be dTon<50 ns

The current change per cycle is given by equation (3).

$$dI=V\text{out}*dT/2L \quad (3)$$

In the worst case, the transformer flux swing per cycle is given by equation (4).

$$dB=(V\text{out}/2)*dT/nAe \quad (4)$$

where nAe is the product of core area and number of turns. In the present example nAe=23 T×119 $\text{um}^2$=2.7 e−3.

In the worst case, the peak flux, which is given by equation (5) is +/−150 mT;

$$B=V\text{out}*5 \text{ us}/nAe \quad (5)$$

The saturation flux density of the core is >300 mT;

If dT in equation (4) is 50 ns (the maximum on-time variation), then dB=3.5 mT. To a first approximation, B/dB=150/3.5=43. Hence dT must be correct in 43 switching cycles.

From equation (3), dI=63 mA. Assuming 488 counts per Amp (current sense gain), this corresponds to 31 counts.

Thus, to a first approximation, in order to correct dTon without saturation 30 counts*43 cycles*C>=65536, where 65536 represents +/−1 integer step or +/−25 ns change in on-time.

This gives a minimum value for the differential current gain, C>=52.

Although it is preferable to prevent any saturation of the transformer, transient saturation of the transformer, ie operation with C<52 is still possible. In this case the transformer will saturate causing a higher effective difference in on-times that will cause larger differential signals. Balance can still be achieved in this way because once timing balance is restored the transformer will automatically come back to a point of balance as a result of equation (1). However, operation with high current stress in one phase must be tolerated whilst the balancing takes place.

The upper limit of C should be selected such that the balancing term does not have a significant impact on changes in duty-cycle from the controller.

A step size dTstep, applied by the control algorithm corresponds to dTstep*65536/25 ns fractional steps, and 1.3 e6*dTstep*488 counts (from equation (3)).

Thus, the on-time reduction in fractional steps caused by the balancing term per cycle is given by 1.3 e6*dTstep*488*C.

Accordingly, it is preferable to have 1.3 e6*dTstep*488*C<<dTstep*65536/25 ns, which corresponds to C<<4132.

Thus, in the example given, a preferred range of values for C is given by 52<C<<4132. The preferred range would be 52<c<413.

Figure 12:
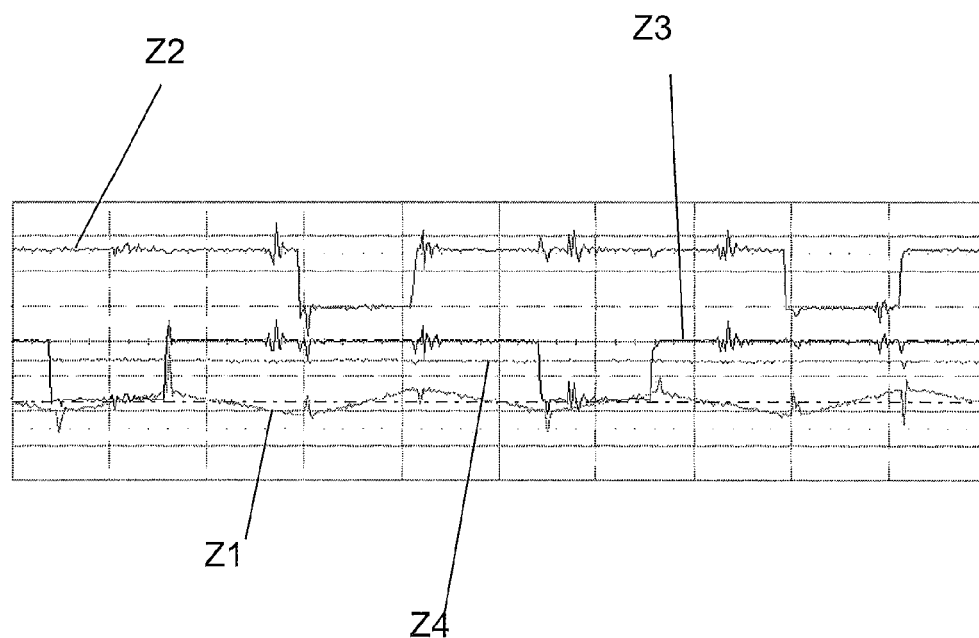
FIGS. 12 to 14 shows operating waveforms of a prototype controller.

FIG. 12 shows operating waveforms for the prototype controller described above, with near perfect timing for the two phases. It can be seen that the current waveform in the transformer is substantially symmetric.

Figure 13:
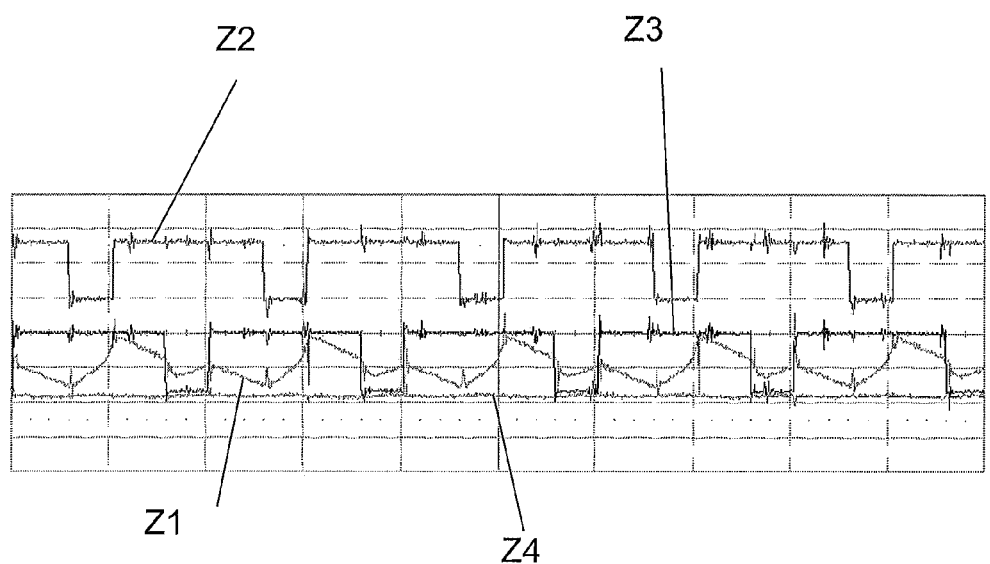

FIG. 13 shows operating waveforms for the prototype controller, where the initial on-time for phase 1 is extended by 50 ns, with the differential current gain C set to zero, such that no current balancing is performed. The resulting current has a significant 100 kHz sawtooth waveform rather than the 200 kHz expected for an interleaved converter. This indicates that the transformer has saturated, and the converter is significantly unbalanced.

Figure 14:
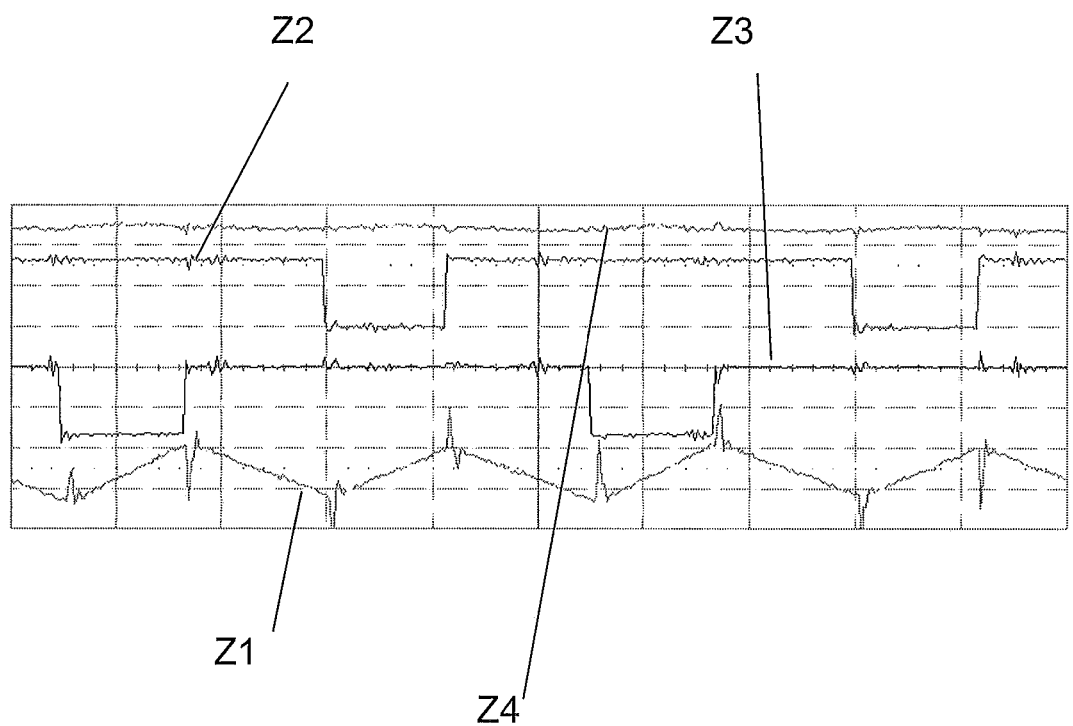

FIG. 14 shows operating waveforms for the prototype controller, where the initial on-time for phase 1 is extended by 50 ns, and the differential current gain C is set to 104. Here it an be seen that current balance is restored.

In FIGS. 12 to 14, line Z1 represents the current in phase 2 of the transformer, line Z2 shows the gate drive signal from the microcontroller for phase 1, line Z3 shows the gate drive signal from the microcontroller for phase 2, and line Z4 shows the current sense signal at the input of the ADC (0.5V/A).

Small differences in one-time that create cycle-to-cycle current changes below the resolution of the ADC will be ignored. This means that a small timing error will remain, which must be balanced by the resistances in the circuit.

In the case of a boost converter:

$$Vout*dTresidual/T=Idc*R \qquad (5)$$

This places a limit on the acceptable ADC resolution and allowable circuit resistances. In the case of the 400 W prototype converter, the ADC resolution is 1.5 mA. Hence, dTresidual=1.2 ns, using the equations in Table 1.

Accordingly, Idc=46 mV/R.

R is approximately 0.5 R, such that Idc<100 mA, which is 5% of the current in each phase at low line, and represents a dc flux of approximately 40 mT in the transformer. This is well within the capability of the ferrite used.

Preferably, the sum of the ac and dc flux will be less than the saturation flux density, which is the case in the example above.

The invention has been described in terms of a 2-phase interleaved boost converter of the type illustrated in FIG. 2. However, the invention is equally applicable to other configurations.

FIG. 1 illustrates an alternative configuration of a 2 phase interleaved power converter which may be controlled by a controller in accordance with an embodiment of the present invention. The converter of FIG. 1 is similar to that of FIG. 2, except that the inductor L1 is omitted, and the magnetically coupled inductive elements of the transformer T1 are replaced by separate inductors LA, LB.

Figure 10:
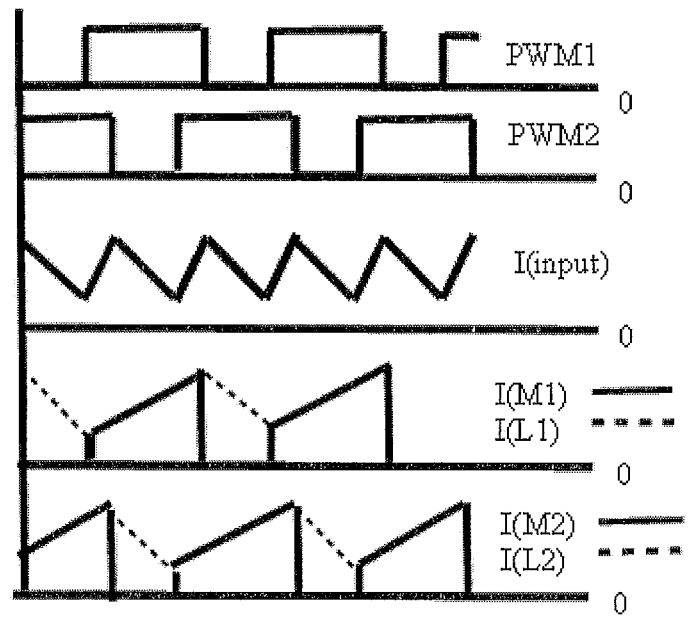
FIG. 10 shows representative current waveforms which illustrate operation of the converter of FIG. 1 at 66% (greater than 50%) duty cycle.

FIG. 10 shows representative current waveforms which illustrate operation of the converter of FIG. 1 at 66% (greater than 50%) duty cycle. In this example, the mid-point of each rising slope of the input current represent suitable sample points, and each sample point is associated with the phase for which turn-off has most recently occurred.

Alternatively, where sampling noise is present, the mid-point of each down slope of the input current may be suitable sample points due to the trade off between the ability to measure the current at very light load and the ability to measure the signal correctly from the noise at high current.

In FIGS. 1 and 2, the converters include a four diode bridge rectifying circuit 25. However, it will be appreciated that alternative rectifying circuits may be used. Moreover, in the case of a DC voltage input, a rectifying circuit is not required.

The above description concerns 2-phase interleaved power converters. However, the principles of the invention can be applied to power converters with more than 2 phases.

A converter with more than 2 phases may be similar to the circuits illustrated in FIGS. 1 and 2, except additional sub-circuits are connected in parallel. In general, an n-phase interleaved power converter comprises n interleaved sub-circuits, where n is an integer greater than 1, and the switching devices in the respective circuits are operated with a phase difference of substantially 360/n degrees.

Figure 11A:
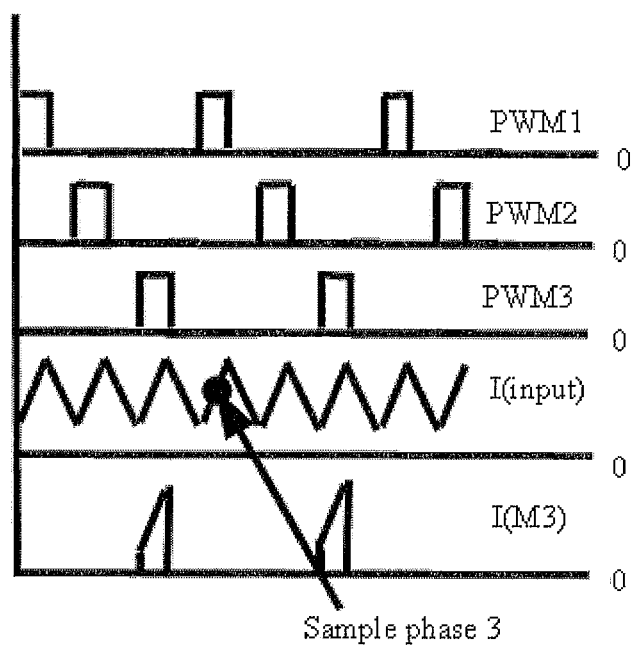
FIGS. 11a, 11b and 11c show representative waveforms for a 3 phase interleaved converter operating at less than 33% duty cycle, 33-66% duty cycle, and above 66% duty cycle respectively.
Figure 11B:
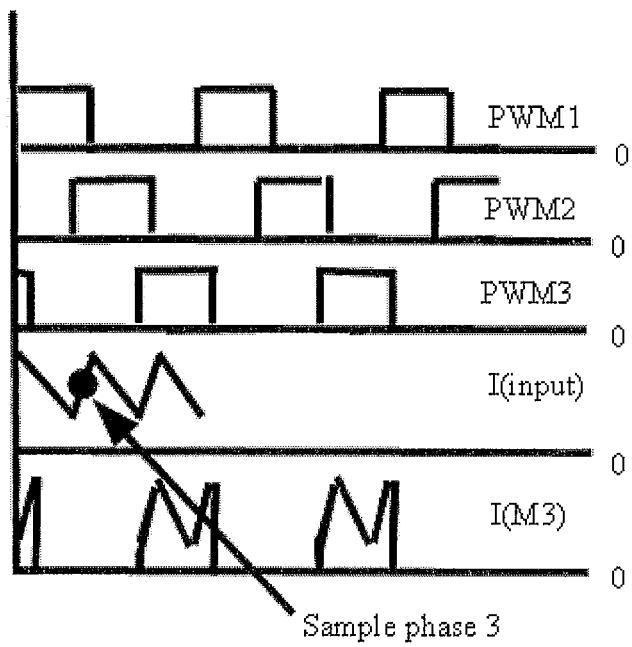
Figure 11C:
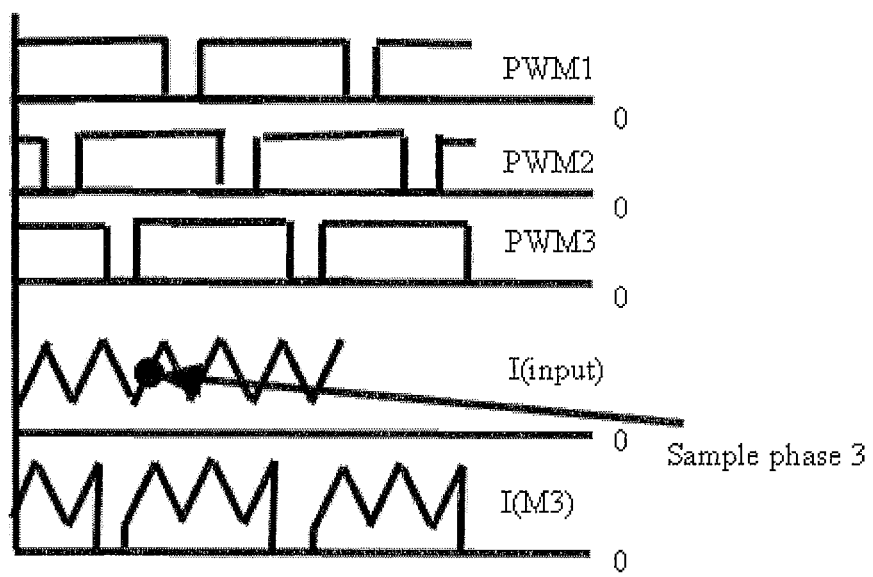

FIGS. 11a, 11b and 11c show representative waveforms for a 3 phase interleaved converter operating at less than 33% duty cycle, 33-66% duty cycle, and above 66% duty cycle respectively. A suitable sample point for phase 3 is indicated by black dot in each figure. In each case, it can be seen that the sample point is located mid-way along the first rising slope following turn-off of the switch associated with phase 3. Similarly, suitable sample points for phases 1 and 2 (not shown) are located mid-way along the first rising slope following turn-off of the switch associated with the respective phase.

More generally, the principles of the invention can be extended to any number of phases, in which case the sample points for each phase are preferably located mid-way along the first rising slope in the input current following turn-off of the switch associated with the respective phase. Furthermore, in the case of operating over 50% duty-cycle the sample points for each phase are preferably located mid-way along the first down slope in the input current following turn-off of the switch associated with the respective phase.

The invention is described in terms of continuous conduction mode operation. However, the principles of the invention also apply for discontinuous and boundary mode operation.

Moreover, the invention has been described above in terms of a boost converter. However, it will be appreciated that the principles of the invention can be used to provide current.

balance in power circuit topologies other than a boost converter. For example, a buck converter.

The invention claimed is:

1. An interleaved power converter for converting a DC voltage source into a DC voltage output, the converter comprising:—
   two or more sub-circuits connected in parallel, each sub-circuit comprising an inductive element, a rectifying element and a controllable switching device connected for converting a DC voltage source into a DC voltage output;
   driving means for driving the switching device of each sub-circuit to repeatedly switch on at a time t1 and off at a time t2, with a phase difference between the switch-on times t1 of each switching device;
   current sensing means for repeatedly determining an input current value associated with each sub-circuit, by sensing the input current of the converter at a sample point a pre-determined time relative to the switch-on time t1 or the switch-off time t2 of said switching device; and
   control means comprising:—
   comparator means for comparing the input current value determined at each sample point with the input current value determined at the preceding sample point, to obtain a measure of current imbalance attributable to one or both of the sub-circuits with which the compared input current values are associated; and
   current balancing means for adjusting the time interval Ton from t1 to t2, for one or both of the sub-circuits with which the compared input current values are associated, to compensate for said current imbalance.

2. The converter as claimed in claim 1 having n sub-circuits, wherein the phase difference between the switching devices is preferably substantially 360/n degrees.

3. The converter as claimed in claim 1 wherein n=2 and the phase difference between the switching devices is preferably substantially 180 degrees.

4. The converter as claimed in claim 1 wherein the current balancing means is configured to adjust the time interval Ton from t1 to t2, for the sub-circuits with which the latest sensed input current value is associated, to compensate for said current imbalance.

5. The converter as claimed in claim 1 wherein the current sensing means is configured to repeatedly determine said input current value associated with each sub-circuit, by sensing the input current of the converter at a sample point after the switch-on time t1 of said switching device.

6. The converter as claimed in claim 1 wherein the current sensing means is configured to repeatedly determine said input current value associated with each sub-circuit, by sensing the input current of the converter at a sample point after the switch-off time t2 of said switching device.

7. The converter as claimed in claim 1 wherein the sample point is calculated to coincide with a rising slope of the input current waveform.

8. The converter as claimed in claim 7 wherein the sample point for each sub-circuit is calculated to coincide with the first rising slope of the input current after the switch-off time t2 for the switching device of the corresponding sub-circuit.

9. The converter as claimed in claim 8 wherein the sample point is calculated to be located substantially mid-way along a rising slope of the input current waveform.

10. The converter as claimed in claim 1, having 2 sub-circuits, wherein the sample point associated with each sub-circuit is substantially Ton/2+T/2 after the most recent switch-on time t1 of said sub-circuit, for operation at <=50% duty cycle.

11. The converter as claimed in claim 1 wherein the sample point is calculated to coincide with a down slope of the input current waveform.

12. The converter as claimed in claim 2 having 2 sub-circuits, wherein the sample point associated with each sub-circuit is substantially Ton/2−T/4 after the most recent switch-on time t1 of said sub-circuit, for operation at >50% duty cycle.

13. The converter as claimed in claim 1 wherein the control means further comprises current following means for adjusting the time interval Ton from t1 to t2 of each sub-circuit to cause the input current of a converter to follow a reference current.

14. The converter as claimed in claim 1 wherein the control means comprises a Proportional Integral Differential (PID) controller.

15. The converter as claimed in claim 1 wherein a differential term is used to adjust for current imbalance.

16. The converter as claimed in claim 1 wherein a proportional and/or an integral term is used to cause the converter to follow a reference current.

17. A controller for an interleaved power converter,
   wherein an interleaved power converter comprises two or more sub-circuits connected in parallel, each sub-circuit comprising an inductive element, a rectifying element and a controllable switching device connected for converting a DC voltage source into a DC voltage output, and driving means for driving the switching device of each sub-circuit in the converter to repeatedly switch on at a time t1 and off at a time t2, with a phase difference between the switch-on times t1 of each switching device;
   the controller comprising:—
   receiving means for repeatedly receiving a signal which represents an input current value associated with each sub-circuit at a sample point a pre-determined time relative to the switch-on time t1 or the switch-off time t2 of said switching device;
   comparator means for comparing the input current value determined at each sample point with the input current value determined at the preceding sample point, to obtain a measure of current imbalance attributable to one or both of the sub-circuits with which the compared input current values are associated; and
   current balancing means for determining the time interval Ton from t1 to t2, for one or both of the sub-circuits with which the compared input current values are associated, to compensate for said current imbalance.

18. A multi-phase interleaved power converter for converting a DC voltage source into a DC voltage output, the converter comprising:—
   two or more sub-circuits connected in parallel, each sub-circuit comprising an inductive element, a rectifying element and a controllable switching device connected for converting a DC voltage source into a DC voltage output;
   driving means for driving the switching device of each sub-circuit to repeatedly switch on at a time t1 and off at a time t2, with a phase difference between the switch-on times t1 of each switching device, such that each sub-circuit is associated with a different phase of the converter; and
   current sensing means for repeatedly determining an input current value associated with each phase, by sensing the input current of the converter at a sample point a pre-determined time relative to the switch-on time t1 or the switch-off time t2 of the switching device; and control means comprising:—
comparator means for comparing the input current value determined for each phase with the input current value determined for the preceding phase, to obtain a measure of current imbalance between said phases; and
current balancing means for adjusting the time interval Ton from t1 to t2, for one or both of the sub-circuits with which the compared input current values are associated, to compensate for said current imbalance.

19. A controller for a multi-phase interleaved power converter,
wherein a multi-phase interleaved power converter comprises two or more sub-circuits connected in parallel, each sub-circuit comprising an inductive element, a rectifying element and a controllable switching device connected for converting a DC voltage source into a DC voltage output, and driving means for driving the switching device of each sub-circuit to repeatedly switch on at a time t1 and off at a time t2, with a phase difference between the switch-on times t1 of each switching device, such that each sub-circuit is associated with a different phase of the converter;
the controller comprising:—
receiving means for repeatedly receiving a signal which represents an input current value associated with each phase at a sample point a pre-determined time relative to the switch-on time t1 or the switch-off time t2 of said switching device;
comparator means for comparing the input current value determined for each phase with the input current value determined for the preceding phase, to obtain a measure of current imbalance between said phases; and
current balancing means for determining the time interval Ton from t1 to t2, for one or both of the sub-circuits with which the compared input current values are associated, to compensate for said current imbalance.

* * * * *